United States Patent
York et al.

(10) Patent No.: US 10,204,332 B2
(45) Date of Patent: Feb. 12, 2019

(54) GROUPING ORDERS FOR DELIVERY TO VENDORS OF A VENUE

(71) Applicant: VenueNext, Inc., Santa Clara, CA (US)

(72) Inventors: John E. York, Santa Clara, CA (US); John M. Paul, Palo Alto, CA (US); Edan Rosenberg, New York, NY (US); Brano Perkovich, Atherton, CA (US); Paraag Marathe, Los Altos, CA (US); Surjansu Kundu, Mountain View, CA (US)

(73) Assignee: VenueNext, Inc., Santa Clara, CA (US)

( * ) Notice: Subject to any disclaimer, the term of this patent is extended or adjusted under 35 U.S.C. 154(b) by 930 days.

(21) Appl. No.: 14/588,234

(22) Filed: Dec. 31, 2014

(65) Prior Publication Data

US 2016/0189279 A1 Jun. 30, 2016

(51) Int. Cl.

| G06Q 20/00 | (2012.01) |
|---|---|
| G06Q 20/32 | (2012.01) |
| G06Q 30/06 | (2012.01) |
| G06N 5/04 | (2006.01) |
| G06F 17/30 | (2006.01) |
| G06Q 10/08 | (2012.01) |
| H04L 29/08 | (2006.01) |
| G06N 99/00 | (2010.01) |
| G06N 5/02 | (2006.01) |

(52) U.S. Cl.
CPC ..... *G06Q 20/322* (2013.01); *G06F 17/30979* (2013.01); *G06F 17/30994* (2013.01); *G06N 5/04* (2013.01); *G06Q 10/087* (2013.01); *G06Q 30/0635* (2013.01); *H04L 67/18* (2013.01); *G06F 2217/16* (2013.01); *G06N 5/02* (2013.01); *G06N 99/005* (2013.01)

(58) Field of Classification Search
None
See application file for complete search history.

(56) References Cited

U.S. PATENT DOCUMENTS

| 7,096,189 B1* | 8/2006 | Srinivasan | G06Q 10/06315 705/7.25 |
|---|---|---|---|
| 7,295,990 B1* | 11/2007 | Braumoeller | G06Q 10/063 705/28 |
| 7,747,543 B1* | 6/2010 | Braumoeller | G06Q 10/083 705/330 |
| 8,117,086 B1* | 2/2012 | Utz | G06Q 30/0635 705/26.81 |

(Continued)

*Primary Examiner* — Gurkanwaljit Singh
(74) *Attorney, Agent, or Firm* — Fenwick & West LLP (57) ABSTRACT

To improve user interaction with a venue, a venue management system is associated with the venue and maintains information associated with users and with vendors associated with the venue. The venue management system receives orders for products or services from users and communicates the received orders to vendors associated with the venue to be fulfilled. The venue management system may group orders having one or more common characteristics received from various users and communicate the group to a vendor to allow the vendor to more efficiently fulfill orders. Further, the venue management system maintains associations between vendors and regions of the venue and may dynamically modify the associations between vendors and regions of a venue to expedite the fulfillment of orders received from various users.

18 Claims, 4 Drawing Sheets

(56) References Cited

U.S. PATENT DOCUMENTS

| | | | | |
|---|---|---|---|---|
| 2004/0054592 A1* | 3/2004 | Hernblad | ............... | G06Q 20/32 |
| | | | | 705/15 |
| 2011/0040655 A1* | 2/2011 | Hendrickson | .......... | G06Q 30/02 |
| | | | | 705/27.1 |
| 2012/0156337 A1* | 6/2012 | Studor | .................... | A47J 31/44 |
| | | | | 426/231 |
| 2014/0075004 A1* | 3/2014 | Van Dusen | ............. | H04L 41/04 |
| | | | | 709/223 |
| 2015/0039450 A1* | 2/2015 | Hernblad | ............ | G06Q 20/202 |
| | | | | 705/15 |

\* cited by examiner

GROUPING ORDERS FOR DELIVERY TO VENDORS OF A VENUE

BACKGROUND

This invention relates generally to facilitating user interaction with a venue, and more specifically to managing communication of orders to vendors associated with the venue.

Venues such as stadiums, convention centers, or amphitheaters frequently host events that large numbers of users attend. These users compensate the venue in exchange for attending the venue during an event, providing revenue to the venue. Many venues also obtain additional revenue from vendors associated with the venue that provide goods or services to users attending the venue or from selling parking spaces in one or more parking lots associated with the venue to users who are attending the venue.

However, if a large number of users attend a venue, congestion may impair many users' experience at the venue. For example, delays in placing orders with vendors or delays in vendors fulfilling received orders may discourage users from purchasing goods or services from vendors associated with the venue, decreasing revenue to the vendor, which decreases revenue to the venue. Additionally, vendors receiving a larger number of orders than they can successfully fulfill in a reasonable time frame often results in the vendors losing user loyalty because of delays or incorrectly fulfilled orders, which may prevent additional users from ordering goods or services from the vendors or may prevent additional orders for goods or services from users. Lack of satisfaction in vendors fulfilling orders may prevent users from subsequently attending the venue.

SUMMARY

A venue is a geographic location, such as a geographic location associated with one or more structures. Examples of a venue include a stadium, a convention center, an arena, a theater, an amphitheater, or other suitable structure or location where people may gather for an event. In various embodiments, users obtain a ticket to enter the venue, and various events are performed at the venue. Additionally, one or more vendors are associated with the venue and provide goods or services to users attending the venue. One or more parking lots, each including spaces for one or more vehicles, are also associated with the venue to allow users to more easily attend the venue.

To improve user interaction with the venue, a venue management system is associated with the venue and maintains information associated with users, with vendors associated with the venue, and with parking lots associated with the venue. The venue management system communicates information about the venue or about events occurring at the venue to client devices associated with users of the venue management system. Additionally, the venue management system receives orders for products or services from users and communicates the received orders to vendors associated with the venue to be fulfilled. Further, the venue management system receives information describing previously purchased spaces in various parking lots, currently occupied spaces in various parking lots, prices associated with various parking lots, and capacities associated with various parking lots. Hence, the venue management system allows a user to more easily obtain content associated with the venue, order products or services from vendors associated with the venue, and park in parking lots associated with the venue.

When the venue management system receives an order from a user that identifies a product or service and identifies a vendor, the venue management system communicates the order to a vendor system corresponding to the identified vendor. The vendor subsequently delivers the product or service identified by the order to the user, communicates a notification to the user via the venue management system when the order is fulfilled, or provides other suitable information to the user. To expedite delivery of products or services, the venue management system may reduce time for users to receive products or services delivered by vendors by maintaining associations between different vendors and different regions of the venue. For example, the venue management system associates one or more vendors with different sections or rows in the venue. A vendor may be associated with more than one region, so orders received from users having locations in one or more of the regions associated with the vendor are communicated to the vendor by the venue management system. During the course of an event at the venue, or during other times, the venue management system may modify associations between a vendor and regions of the venue to prevent a vendor from receiving greater than a threshold number of orders during one or more time intervals. Modifying the associations between a vendor and regions of the venue allows the venue management system to regulate a number of orders received by a vendor to allow the vendor to fulfill the orders in less than a threshold amount of time or within a range of times by communicating orders from users having locations in a particular region to vendors having received less than a threshold number of orders or having less than a threshold time for fulfilling orders.

In some embodiments, the venue management system modifies regions associated with a vendor based on a number or a frequency of orders received from users associated with different regions as well as time to fulfill orders by different vendors, and numbers of orders received by different vendors. Additionally, the venue management system accounts for products or services offered by different vendors when modifying associations between regions of the venue and vendors. Accounting for products or services offered by different vendors allows the venue management system to provide users in a region with similar products or services before and after modifying vendors associated with the region.

Vendors may fulfill orders received from users in the venue by deliver products to users in various regions of the venue. To allow a vendor to more efficiently fulfill orders received from users, the venue management system regulates communication of orders between users and vendors in some embodiments. When the venue management system receives an order for a product or service from a user identifying a vendor, the venue management system stores the received order in a queue for a specified time interval before communicating the order to the vendor identified by the order. One or more characteristics of an order may be analyzed by the venue management system to determine a position in the queue in which to store the order. For example, the venue management system determines a status of an order from whom an order was received, a number of products identified by the order, or the type of products identified in the order, as well as a time when the order was received, to determine a position in the queue of the order.

Storing the order in a queue for a specified time interval before communicating the order to a vendor allows the venue management system to receive additional orders for communication to the vendor along with the order. For example, if the venue management system receives additional orders having one or more characteristics matching or similar to the order stored in the queue and identifying the vendor identified by the order while the order is stored in the queue, the venue management system generates a group including the additional orders and the order stored in the queue. The group of orders is then communicated from the venue management system to the vendor for fulfillment. For example, the venue management system generates a group including additional orders associated with users having locations matching a location of a user associated with an order stored in the queue. As additional examples, the venue management system generates a group including orders identifying products or services matching, or similar to, a product or service specified by an order stored in the queue or generates a group including orders identifying products or services having times for fulfillment within a threshold value of a time for fulfillment of the order stored in the queue. Communicating a group of orders having one or more matching or similar characteristics to a vendor allows the vendor to more efficiently fulfill orders from users.

The figures depict various embodiments for purposes of illustration only. One skilled in the art will readily recognize from the following discussion that alternative embodiments of the structures and methods illustrated herein may be employed without departing from the principles of described herein.

DETAILED DESCRIPTION

Venue Overview

Figure 1:
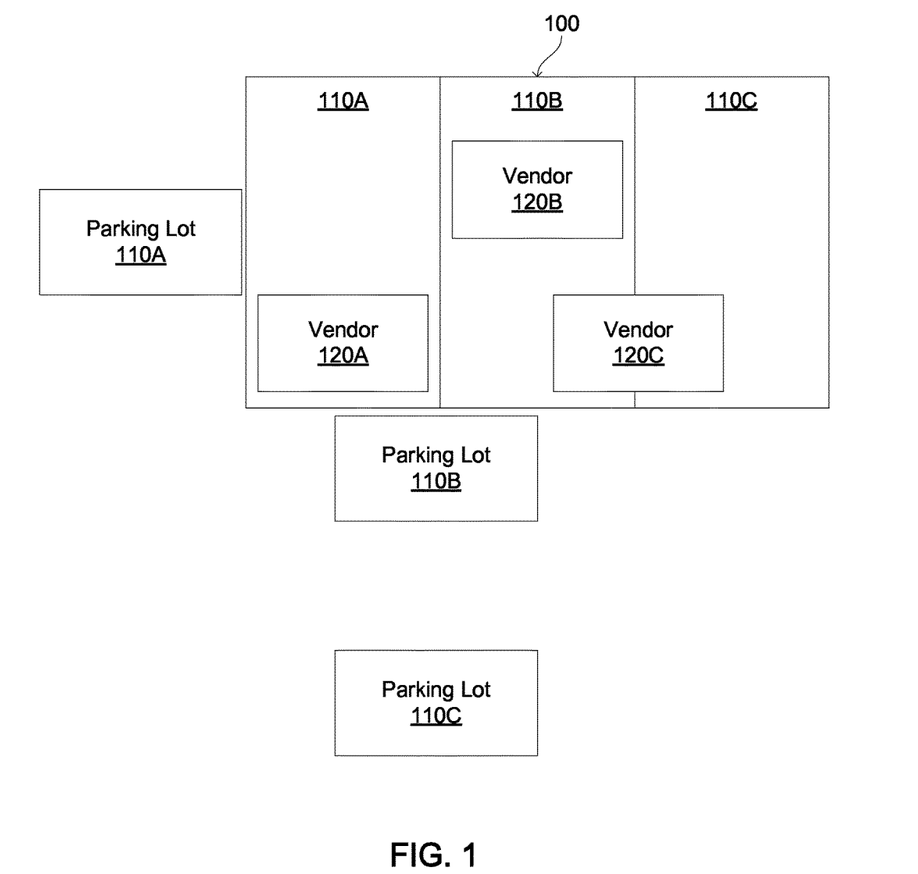
FIG. 1 is a block diagram of a venue, in accordance with an embodiment.

FIG. 1 is a block diagram of one embodiment of a venue 100. In the example of FIG. 1, the venue includes multiple regions 110A, 110B, 110C (also referred to individually and collectively using reference number 110). Additionally, one or more vendors 120A, 120B, 120C (also referred to individually and collectively using reference number 120) are included in the venue 100, and one or more parking lots 130A, 130B, 130C (also referred to individually and collectively using reference number 130) are associated with the venue 100. However, in other embodiments, different and/or additional components may be associated with or included in the venue 100.

The venue 100 is a geographic location, such as a geographic location associated with one or more structures. Examples of a venue 100 include a stadium, a convention center, an arena, a theater, an amphitheater, or other suitable structure. One or more regions 110 are included in the venue 100, with each region 110 corresponding to an area including a set of locations within the venue 100. For example, different regions 110 correspond to different sections of a stadium, different aisles of a stadium or arena, different rooms in a convention center, or any other suitable area within the venue 100. In some embodiments, an area within the venue 100 is associated with multiple regions 110 having different levels of precision. For example, a specific seat in a venue 100 is associated with a region 110 identifying a section including the seat, another region 110 identifying an aisle within the section including the seat, and an additional region identifying the specific seat. While FIG. 1 shows an example venue 100 including three regions 110A, 110B, 110C, in other embodiments, a venue 110 may include any number of regions 110.

One or more vendors 120 are included in the venue 110, with each vendor providing products or services to users within the venue 110. Examples of vendors 120 include restaurants, food service providers, beverage providers, merchandise retailers, or other suitable entities providing products or services. Different vendors 120 may be associated with different regions 110 of the venue. For example, a vendor 120A is associated with a region 110A, while a different vendor 120B is associated with a different region 110B. A vendor 110 may be associated with multiple regions 110; for example, a vendor 110C is associated with a region 110B as well as with an additional region 110C. In some embodiments, a vendor 120 is associated with a region 110 based on a distance between the vendor 120 and the region 110. For example, the vendor 120 is associated with a region 110 having a minimum distance from a location associated with the vendor 120. If a location associated with a vendor 120 is within a region 110, the vendor 120 is associated with the region 110 including the vendor's associated location.

Additionally, one or more parking lots 130A, 130B, 130C are associated with the venue 110 and identify physical locations for parking vehicles. Each parking lot includes one or more spaces, each space for parking a vehicle. A price is associated with each parking lot 130 specifying an amount of compensation a user provides to an entity associated with the venue 110 for a space in the parking lot 130 to be allocated for parking a vehicle associated with the user. Different parking lots 130 may have different distances from the venue 110, and prices associated with different parking lots 130 may be inversely proportional to a distance between a parking lot 130 and the venue 110. Each parking lot 130 is also associated with a capacity specifying a maximum number of vehicles that may be parked in a parking lot 130. The capacity may be total number of spaces in the parking lot 130 or may be a maximum number of vehicles. Information may be maintained by one or more devices included in a parking lot 130 specifying a number of spaces in the parking lot 130 in which vehicles are parked, specifying a number of vehicles within a geographic area associated with the parking lot 130, or any other suitable information. For example, a device included in the parking lot 130 increments a counter when a vehicle enters the geographic area associated with the parking lot 130 or when a vehicle is parked in a space of the parking lot 130.

System Architecture

Figure 2:
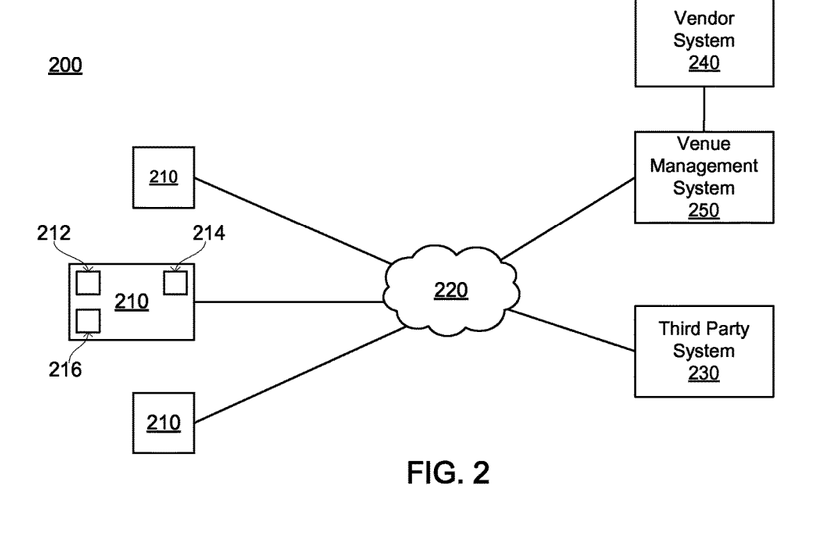
FIG. 2 is a block diagram of a system environment including a venue management system, in accordance with an embodiment.

FIG. 2 is a block diagram of a system environment 200 for a venue management system 250. The system environment 200 shown by FIG. 1 includes various client devices 210, a network 220, a third party system 230, one or more vendor systems 240, and a venue management system 250. In alternative configurations, different and/or additional components may be included in the system environment 200. The embodiments described herein may be adapted to online systems other than venue management systems.

A client device 210 is one or more computing devices capable of receiving user input as well as transmitting and/or receiving data via the network 220. In one embodiment, the client device 210 is a conventional computer system, such as a desktop computer or a laptop computer. Alternatively, the client device 210 may be a device having computer functionality, such as a personal digital assistant (PDA), a mobile telephone, a smartphone or another suitable device. A client device 210 is configured to communicate with other devices via the network 220. In one embodiment, the client device 210 executes an application allowing a user of the client device 210 to interact with the venue management system 250. For example, the client device 210 executes a browser application to enable interaction with the venue management system 250 or with one or more third party system 230 via the network 220. In another embodiment, a client device 210 interacts with the venue management system 250 through an application programming interface (API) running on a native operating system of the client device 210, such as IOS® or ANDROID™.

A display device 212 included in a client device 210 presents content items to a user of the client device 210. Examples of the display device 212 include a liquid crystal display (LCD), an organic light emitting diode (OLED) display, an active matrix liquid crystal display (AMLCD), or any other suitable device. Different client devices 210 may have display devices 212 with different characteristics. For example, different client devices 212 have display devices 212 with different display areas, different resolutions, or differences in other characteristics.

One or more input devices 214 included in a client device 210 receive input from the user. Different input devices 214 may be included in the client device 210. For example, the client device 210 includes a touch-sensitive display for receiving input data, commands, or information from a user. Using a touch-sensitive display allows the client device 210 to combine the display device 212 and an input device 214, simplifying user interaction with presented content items. In other embodiments, the client device 210 may include a keyboard, a trackpad, a mouse, or any other device capable of receiving input from a user. Additionally, the client device may include multiple input devices 214 in some embodiments. Inputs received via the input device 214 may be processed by an application associated with the venue management system 250 and executing on the client device 210 to allow a client device user to exchange information with the venue management system 250.

Additionally, a client device 210 may include one or more position sensors 216, which determine a physical location associated with the client device 210. For example, a position sensor 216 is a global positioning system (GPS) sensor that determines a location associated with the client device 210 based on information obtained from GPS satellites communicating with the GPS sensor, such as coordinates specifying a latitude and longitude of the location associated with the client device 210. As another example, a position sensor 216 determines a location associated with the client device 210 based on intensities of signals received from one or more access points (e.g., wireless access points) by the client device 110. In the preceding example, the position sensor 216 determines a location associated with the client device 210 based on signal intensity between the client device 210 and one or more wireless access points and service set identifiers (SSIDs) or media access control (MAC) addresses of the wireless access points. However, the client device 210 may include any suitable type of position sensor 216. In various embodiments, the client device 210 may include multiple position sensors 216.

The network 220 may comprise any combination of local area and/or wide area networks, using both wired and/or wireless communication systems. In one embodiment, the network 220 uses standard communications technologies and/or protocols. For example, the network 220 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 220 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 220 may be represented using any suitable format, such as hypertext markup language (HTML) or extensible markup language (XML). In some embodiments, all or some of the communication links of the network 220 may be encrypted using any suitable technique or techniques.

One or more third party systems 130 may be coupled to the network 220 for communicating with one or more client devices 110 or with the venue management system 250. In one embodiment, a third party system 230 is an application provider communicating information describing applications for execution by a client device 210 or communicating data to client devices 110 for use by an application executing on the client device 210. In other embodiments, a third party system 230 provides content or other information for presentation via a client device 210. For example, a third party system 230 provides content related to an event occurring at the venue 110 to a client device 210 for presentation to a user; as an example, the third party system 230 provides video or audio data of a portion of an event occurring at the venue to a client device 210, allowing a user associated with the client device 210 to view the portion of the event from an alternative vantage point than the user's vantage point or to hear commentary about the portion of the event. As another example, a third party system 230 is a social networking system maintaining connections between various users and providing content for presentation to users based at least in part on the maintained connections. A third party system 230 may also communicate information to the venue management system 250, which subsequently communicates the information, or a portion of the information, to one or more client devices 110 via the network 220.

Additionally, one or more vendor systems 240 are coupled to the venue management system 250 via the network 220 or through direct connections between the vendor systems 240 and the venue management system 250. A vendor system 240 is associated with a vendor 120 and receives orders for products or services from the venue management system 250 and provides the products or services identified by the orders. Further, a vendor system 240 provides the venue management system 250 with information describing fulfillment of orders by a vendor 120 associated with the vendor system 240. For example, the vendor system 240 provides information to the venue management system 250 specifying an estimated time to fulfill subsequently received or pending orders for products or services, an average time in which previously received orders were fulfilled, a number of unfulfilled orders received by the vendor system 240, or other suitable information. Information provided from the vendor system 240 to the vendor management system 250 accounts for orders received via the venue management system 250 as well as orders received by the vendor 120 associated with the vendor system 240 from users visiting a location associated with the vendor 120.

Additionally, a vendor system 240 may provide information to the venue management system 250 describing products or services sold by a vendor 120 associated with the vendor system 240. For example, the vendor system 240 identifies a number of different products or services 140 sold by the vendor 120 or identifies an amount of revenue received by the vendor 120 in exchange for different products or services. Information describing sold products or services may be communicated from the vendor system 240 to the venue management system 250 as the products or services are sold or may be communicated from the vendor system to the venue management system 250 at periodic intervals. Additionally, the venue management system 250 may request information describing sales of products or services to a vendor system 240, which provides the requested information to the venue management system 250 in response to receiving the request.

The venue management system 250, which is further described below in conjunction with FIG. 3, receives content from one or more third party systems 230 or generates content and provides content to users via an application associated with the venue management system 250 and executing on client devices 210. Additionally, the venue management system 250 maintains information associated with one or more parking lots 130 associated with a venue 100, such as a number of spaces in a parking lot 130 currently occupied, a price associated with a the parking lot 130, or a number of spaces in the parking lot 130 that have been purchased, as well as directions for navigating to a location associated with the parking lot 130. The venue management system 250 may communicate certain information associated with a parking lot 130 to one or more users, such as the price associated with the parking lot 130 or directions to the location associated with the parking lot 130. Associations between one or more vendors 120 and regions 110 of the venue 100 are also included in the venue management system 250, which also receives orders for products or services from one or more users and communicates the orders to one or more vendors 120 for fulfillment.

Figure 3:
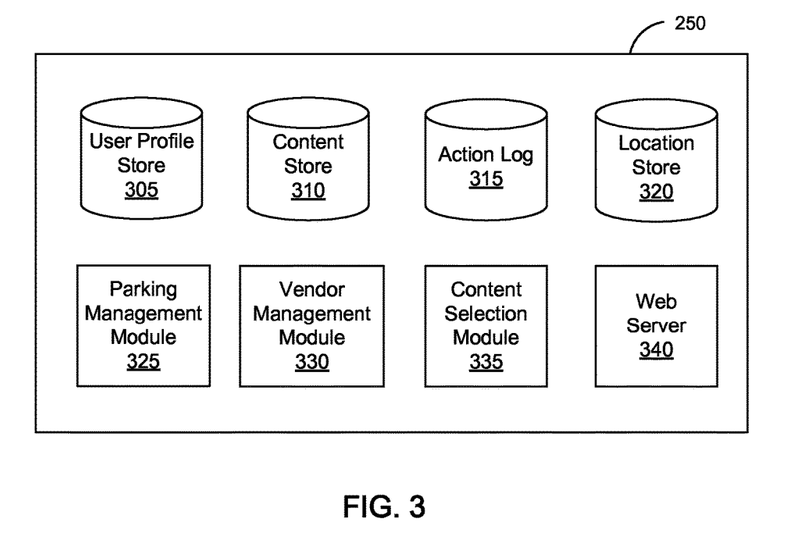
FIG. 3 is a block diagram of a venue management system, in accordance with an embodiment.

FIG. 3 is a block diagram of an architecture of a venue management system 250. The venue management system 250 shown in FIG. 3 includes a user profile store 305, a content store 310, an action log 315, a location store 320, a parking management module 325, a vendor management module 330, a content selection module 335, and a web server 340. In other embodiments, the venue management system 250 may include additional, fewer, or different components for various applications. Conventional components such as network interfaces, security functions, load balancers, failover servers, management and network operations consoles, and the like are not shown so as to not obscure the details of the system architecture.

Each user of the venue management system 250 is associated with a user profile, which is stored in the user profile store 305. A user profile includes declarative information about the user provided by the user and may also include information inferred by the venue management system 250 from actions associated with the user or from other information. In one embodiment, a user profile includes multiple data fields, each describing one or more attributes of the corresponding user. Examples of information stored in a user profile include demographic information, contact information, preferences, and location information. For example, a user profile identifies a region 110 of the venue 100 associated with a user, such as a region 110 including a seat associated with a ticket to attend the venue 100 associated with the user. A user profile may also store other information provided by the user, for example, image data or video data. Additionally, a user profile in the user profile store 205 may also maintain references to actions by the corresponding user performed on content presented by the venue management system 250 or interactions between the corresponding user captured by one or more vendor systems 240 and communicated to the venue management system 250. For example, a user profile identifies prior orders for products or services the venue management system 250 received from a user and communicated to one or more vendor systems 150.

In some embodiments, a user profile includes a status associated with the user. The venue management system 250 may provide different functionality to a user based on the user's status. For example, the venue management system 250 communicates certain types of messages to client devices 210 associated with users having a specific type of status and does not communicate the certain types of messages to client devices 210 associated with users that do not have the specific type of status. As another example, the venue management system 250 presents less advertisement content to users having specific statuses. The status may be based on a frequency with which the user is associated with tickets to attend the venue 100 or an amount of money the venue management system 250 has received from the user (e.g., based on an amount the user has spent on tickets to attend the venue 100). Additionally, a user may provide an amount of compensation to the venue management system 250 for a specific status to be associated with the user. For example, the user provides the venue management system 250 with an amount of compensation per year or per month for the venue management system 250 to associate a specific status with the user.

The content store 310 stores objects that each represents various types of content received from one or more third party systems 230 or generated by the venue management system 250. Examples of content represented by an object include video data associated with an event occurring at the venue 100, image data associated with an event occurring at the venue 100, audio data associated with an event occurring at the venue 100, text data associated with an event occurring at the venue 100, information associated with the venue 100 or with the location of the venue 100, or other suitable. Additionally, content may be received from applications associated with a third party system 230 and executing on client devices 210 associated with users of the venue management system 230. In one embodiment, objects in the content store 210 represent single pieces of content, or content "items."

The action log 315 stores information describing actions performed by venue management system users internal to or external to the venue management system 250. For example, actions performed by a user on a third party system 230 that communicates information to the venue management system 250 are stored in the action log 315 along with information describing actions performed by the user through the venue management system 250. Examples of actions include: ordering a product or service from a vendor 120 included in the venue 100, checking-into the venue, accessing content provided by the venue management system 250 or provided by a third party system 230 that communicates with the venue management system 250, providing a review of a product, service, or vendor 120 to the venue management system 250 or to a third party system 230 that communicates with the venue management system 250, providing a comment associated with the venue 100 or with an event occurring at the venue 100 to the venue management system 250 or to a third party system 230 that communicates with the venue management system 250. However, any suitable action may be stored in the action log 315 and associated with a user profile in the user profile store 305. Information in the action log 315 may identify the user performing an action, a type of the action, a description of the action, a time associated with the action, or any other suitable information. In some embodiments, data from the action log 315 is used to infer interests or preferences of a user, augmenting interests included in the user's user profile and allowing a more complete understanding of user preferences.

The action log 315 may also store user actions taken on a third party system 230, such as an external website, and communicated to the venue management system 250. For example, an e-commerce website may recognize a user of the venue management system 250 through a plug-in enabling the e-commerce website to identify the venue management system user. Because users of the venue management system 250 are uniquely identifiable, third party systems 230 may communicate information about a user's actions outside of the venue management system 250 to the venue management system 250 for association with the user. Hence, the action log 315 may record information about actions users perform on a third party system 230, such as purchases made, comments on content, or other information a user authorizes a third party system 230 to communicate to the venue management system 250.

The location store 320 includes physical locations associated with various regions 110 of the venue 100. In various embodiments, the location store 320 includes a region identifier associated with each region 110 and information identifying a geographic area associated with the region identifier. Any suitable information may identify the geographic area associated with a region identifier. Example information identifying a geographic area of a region 110 include: physical coordinates specifying boundaries of a region 110 and an identifier of a portion of the venue 100 including the region 110. Additionally, the location store 320 includes data associating vendors 120 with one or more regions 110 of the venue 100. A vendor identifier uniquely associated with a vendor 120 is associated with a region identifier, with the association stored in the location store 320. Multiple vendors 120 may be associated with a region 110 of the venue 100.

In some embodiments, the location store 320 also associates location information with users of the venue management system 250. A client device 210 communicates location information to the venue management system 250, which may store the location information in the location store 320 or in the user profile store 305 in association with the user. Based on the received information, the venue management system 250 may determine a region 110 of the venue including the location information and associate the region identifier of the determined region with a user profile corresponding to the user. If the venue management system 250 receives modified location information from the client device 210, the venue management system 205 may modify the determined region 110 if a different region includes the modified location information. Alternatively, one or more sensors included in the venue 100 identify a client device 210 and determine a location associated with the client device 210. Based on the determined location, the venue management system 250 identifies a region 110 including the client device 110 and stores a region identifier of the region 110 in association with a user identifier of a user associated with the client device 210. In various embodiments, information identifying a location associated with the client device 210 (e.g., latitude and longitude) is also stored in the location store 320 in association with an identifier associated with the user associated with the client device 210. Additionally, the venue management system 250 may assign a location to a user and store the assigned location in association with the user in the location store 320. For example, when a user purchases a ticket to enter the venue 100, the ticket is associated with a location assigned to the user, and the location store 320 includes information associating the location assigned to the user from the ticket with an identifier associated with the user.

The parking management module 325 includes information identifying parking lots 130 associated with the venue and describing various parking lots 130. Each parking lot 130 is associated with a lot identifier that uniquely identifies a parking lot 130. Characteristics of a parking lot 130 are stored in the parking management module 325 in association with a lot identifier corresponding to the parking lot 130. Characteristics of a parking lot 130 include a capacity for the parking lot 130 that specifies a maximum number of vehicles capable of being parked in the parking lot 130 and a price associated with the parking lot 130 for allocating a space in the parking lot 130 to a vehicle. Additional characteristics of a parking lot 130 include one or more locations associated with the parking lot 130 (e.g., entrances) and directions to the location associated with the parking lot 130. Directions from one or more locations associated with the parking lot 130 to the venue 100 may also be maintained by the parking management module 325.

Certain characteristics of a parking lot 130 are modified based on information is received by the venue management system 250. As users purchase spaces in a parking lot 130, the parking management module 325 maintains a number of purchased spaces associated with the parking lot 130. Additionally, when a vehicle enters a parking lot 130, information is communicated from the parking lot to the venue management system 250, where the parking management module 325 maintains a number of vehicles currently occupying the parking lot 130 or a number of currently occupied spaces in the parking lot 130. In some embodiments, a ticket is scanned or other information is captured by a device (e.g., scanner, card reader, terminal) when a vehicle enters the parking lot 130; the device communicates an indication that information was captured to the venue management system 250, causing the parking management module 325 to increment a number of spaces in the parking lot 130 currently associated with vehicles or to increment a number of currently occupied spaces in the parking lot 130. Thus, the parking management module 325 maintains a number of spaces in a parking lot 130 that are currently occupied by vehicles and modifies the number of currently occupied spaces as vehicles are parked in the parking lot.

Based on a number of spaces currently associated with vehicles in various parking lots 130, the parking management module 325 may communicate messages to client devices 210 identifying one or more of the parking lots 130. In one embodiment, the parking management module 325 selects a parking lot 130 based on a difference between a number of previously purchased spaces in the parking lot 130 and a number of currently occupied spaces in the parking lot 130. For example, the parking management module 325 selects a parking lot 130 having at least a threshold difference between a number of previously purchased spaces and a number of currently occupied spaces, which indicates there are at least the threshold number of unoccupied spaces in the selected parking lot 130. To increase the number of vehicles in the selected parking lot 130, the parking management module 325, the parking management module communicates a message to client devices 110 associated with one or more users identifying the selected parking lot. The message may indicate a number of unoccupied spaces in the selected parking lot 130 as well as the price associated with the selected parking lot 130. In some embodiments, the parking management module 325 modifies the price associated with the selected parking lot 130 to encourage users to park vehicles in spaces of the selected parking lot. The parking management module 235 may also modify a price associated with the selected parking lot 130 to encourage users to park vehicles in spaces of the selected parking lot 130. For example, the parking management module 325 decreases a price of the selected parking lot 130 to increase likelihoods of users purchasing spaces in the selected parking lot 130.

The parking management module 325 also receives information describing traffic conditions within a threshold distance of the parking lot 130 associated with the user and determines the directions for communication to the user based at least in part on the traffic conditions. Information describing the traffic conditions includes a number of currently occupied spaces in one or more additional parking lots 130, such as additional parking lots 130 within a threshold distance of the parking lot 130 associated with the user. Based on the information describing the traffic conditions, the parking management module 325 may modify the directions to one or more locations associated with the parking lot associated with the user. For example, the parking management module 325 modifies the directions to a location associated with the parking lot 130 to avoid one or more additional parking lots 130 with at least a threshold number of currently occupied spaces or to avoid one or more geographic regions having at least a threshold number or density of vehicles. As traffic conditions change, the parking management module 325 may further modify the direction to a location associated with the parking lot 130 and communicate the further modified directions to the client device 210 associated with the user, allowing a user to bypass congestion when travelling to the parking lot 130 associated with the user.

The vendor management module 330 receives orders for products or services from client devices 210 associated with users and communicates the orders to one or more vendor systems 240 of vendors 120 associated with the venue 100. In various embodiments, the vendor management module 330 includes vendor profiles each associated with one or more vendors 120 associated with the venue 100. A vendor profile includes a vendor identifier uniquely identifying a vendor 120 and additional information associated with the vendor 120, such as one or more regions 110 of the venue 100 associated with the vendor 120 and information for communicating with a vendor system 240 associated with the vendor 120. Further examples of information associated with the vendor 120 and included in a vendor profile include: contact information, hours of operation, a listing of products or services provided by the vendor 120, a current inventory or products maintained by the vendor 120, and a current time for the vendor 120 to fulfill received orders. However, in other embodiments, additional or different information may be included in the vendor profile. One or more users authorized by the venue management system 250 may communicate information to the vendor management module 330 to modify regions 110 of the venue 100 associated with one or more vendors 120.

When the vendor management module 330 receives an order identifying a product or service and identifying a vendor 120 from a user, the vendor management system 330 communicates the order to a vendor system 240 corresponding to the identified vendor 120. The vendor 120 may subsequently deliver the product or service identified by the order to the user or may communicate a notification to the user via the venue management system 250 when the order is fulfilled. To expedite delivery of products or services, the vendor management module 330 may associate different vendors 120 with different regions 110 of the venue 100 to reduce time for users to receive products or services delivered by vendors 120. The vendor management module 330 may modify regions 110 of the venue 100 associated with a vendor 120 by modifying identifiers of regions 110 included in a vendor profile of a vendor 120. In some embodiments, the vendor management module 330 modifies regions 110 associated with a vendor 120 based on a number or a frequency of orders received from users associated with different regions 110 as well as a time to fulfill orders by different vendors 120, products or services offered by different vendors 120 or a number of orders received by different vendors 120. When modifying regions 110 associated with a vendor 120 or vendors 120 associated with a region, the vendor management module 330 may account for products or services provided by various vendors 120 so similar products or services are provided to users in a region 110 before and after modification of the vendors 120 associated with the region 110. Modification of one or more vendors 120 associated with regions 110 of the venue 100 is further described below in conjunction with FIG. 5.

Additionally, the vendor management module 330 receives information from a vendor system 240 and communicates the information to one or more client devices 210 for presentation to users. For example, the vendor system 240 communicates a time to fulfill an order, an estimated time to fulfill an order, a number of previously received orders that have yet to be fulfilled, or other suitable information to the vendor management module 330, which provides at least a subset of the information to a client device 210 for presentation to a user. As another example, a vendor system 240 communicates a message to the vendor management module 330 including a user identifier, an order identifier (or a description of an order), and an indication that an order corresponding to the order identifier has been fulfilled by a vendor. The vendor management module 330 identifies a user corresponding to the user identifier from the user profile store 305 and communicates the message to a client device 210 associated with the user.

As vendors 120 may deliver products to users in various regions 110 of the venue 100 to fulfill orders received from various users, in some embodiments, the vendor management module 330 regulates communication of orders received from client devices 210 associated with users to vendor systems 240 associated with various vendors 120. When the vendor management module 330 receives an order for a product or a service from a client device 210 associated with a user, the vendor management module 330 stores the received order in a queue for a specified time interval before communicating the order to a vendor system 240 corresponding to a vendor 120 identified by the order. If the vendor management module 330 receives additional orders from users having one or more characteristics matching or similar to the order stored in the queue and identifying the vendor 120 identified by the order while the order is stored in the queue, the vendor management module 330 generates a group including the additional orders and the order stored in the queue and communicates the group or orders to a vendor system 240 associated with the vendor 120 to be fulfilled. For example, the vendor management module 330 generates a group including additional orders associated with users having a location matching a location of a user associated with an order stored in the queue. As additional examples, the vendor management module 330 generates a group including orders identifying products or services matching, or similar to, a product or service specified by an order stored in the queue or generates a group including orders identifying products or services having times for fulfillment within a threshold value of a time for fulfillment of the order stored in the queue. Communicating a group of orders having one or more matching or similar characteristics to a vendor system 240 allows the vendor 120 associated with vendor system 240 to more efficiently fulfill orders from users. Generation and communication of a group of orders to a vendor system 240 is further described below in conjunction with FIG. 5.

The content selection module 335 selects one or more content items for communication to a client device 210 for presentation to a user. Content items eligible for presentation to the user are retrieved from the content store 310, from a third party system 230, or from another source, by the content selection module 335, which selects one or more of the content items for presentation to the user. A content item eligible for presentation to the viewing user is a content item associated with at least a threshold number of targeting criteria satisfied by characteristics of the user or is a content item that is not associated with targeting criteria. For example, a content item associated with targeting criteria specifying a threshold distance of the venue 100 is identified as eligible for presentation to users associated with locations within a threshold distance of the venue 100. As another example, a content item associated with targeting criteria specifying attendance of an event at the venue 100 is identified as eligible for presentation to users attending the event or who have indicated they will attend the event. In various embodiments, the content selection module 335 includes content items eligible for presentation to the user in one or more selection processes, which identify a set of content items for presentation to the user. For example, the content selection module 335 determines a measure of relevance of various content items to a user based on characteristics associated with the user by the venue management system 250 based on actions associated with the user by the venue management system 250, characteristics of the user maintained by the venue management system 250, preferences of the user maintained by the venue management system 250, and characteristics of content items eligible for presentation to the user. For example, the content selection module 335 determines measures of relevance to a user based on characteristics of the content items, characteristics of the user, and actions associated with the user. Based on the measures of relevance, the content selection module 335 selects one or more content items for presentation to the user (e.g., content items having at least a threshold measure of relevance, content items having highest measures of relevance relative to other content items). In some embodiments, the content selection module 335 ranks content items based on their associated measures of relevance and selects content items having the highest positions in the ranking or having at least a threshold position in the ranking for presentation to the user.

A content item may be associated with bid amounts specifying an amount of compensation received by the venue management system 250 from a third party system 130 or from a user if one or more criteria associated with the content item are satisfied. For example, a bid amount associated with a content item specifies an amount of compensation received by the venue management system 250 when the content item is presented to a user or when a user presented with the content item performs a specified type of interaction with the content item. The content selection module 335 uses the bid amounts associated with various content items when selecting content for presentation to the user. In various embodiments, the content selection module 335 determines an expected value associated with various content items based on their bid amounts and selects content items associated with a maximum expected value or associated with at least a threshold expected value for presentation to the user. An expected value associated with a content item represents an expected amount of compensation to the venue management system 250 for presenting a content item. For example, the expected value associated with a content item is a product of the content item's bid amount and a likelihood of the user interacting with the content item. The content selection module 335 may rank content items associated with bid amounts separately than content items that are not associated with bid amounts and select content items for presentation based on the separate rankings (e.g., content items having at least a threshold position in a ranking).

The web server 340 links venue management system 250 via the network 220 to one or more client devices 210, as well as to one or more third party systems 230. Additionally, the web server 340 may exchange information between the venue management system 250 and one or more vendor systems 240. The web server 340 serves web pages, as well as other content, such as JAVA®, FLASH®, XML and so forth. The web server 340 may receive and route messages between the venue management system 250 and a client device 210, for example, instant messages, queued messages (e.g., email), text messages, short message service (SMS) messages, or messages sent using any other suitable messaging technique. A user may send a request to the web server 340 to upload information (e.g., images or videos) that are stored in the content store 210. Additionally, the web server 340 may provide application programming interface (API) functionality to send data directly to native client device operating systems, such as IOS®, ANDROID™, WEBOS® or BlackberryOS.

Grouping Orders for Communication to a Vendor System

Figure 4:
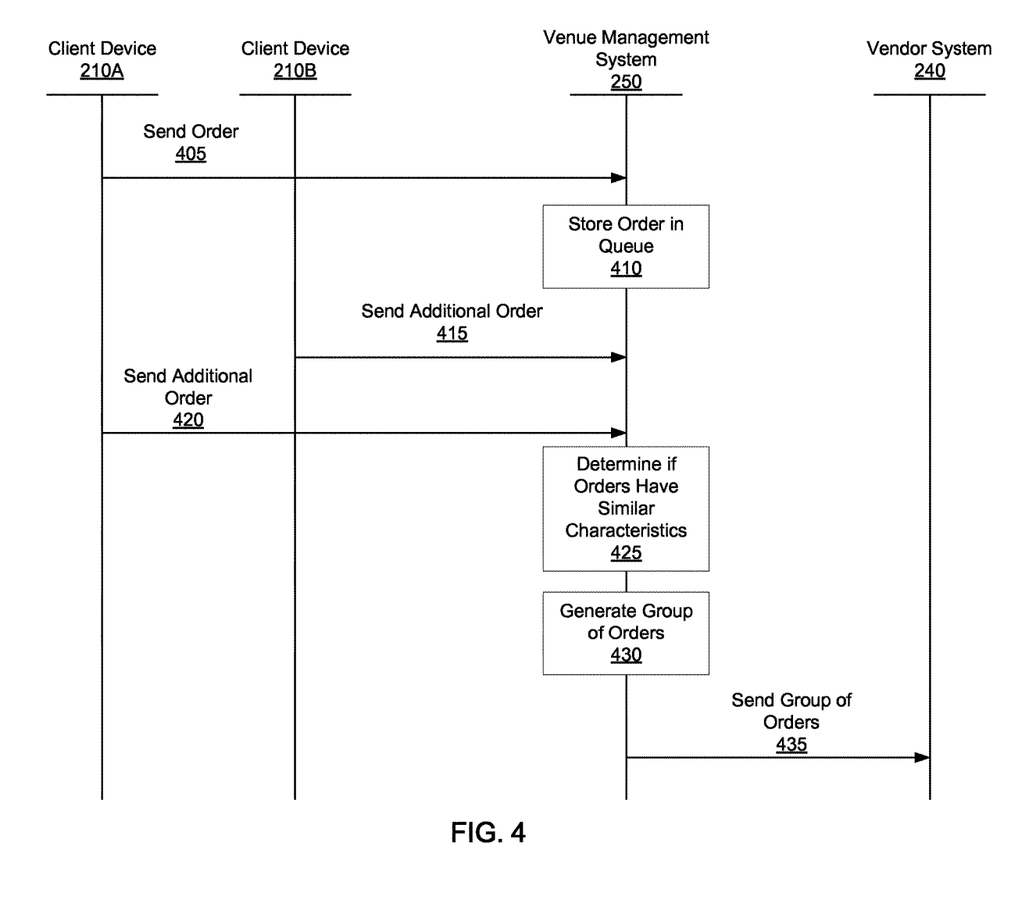
FIG. 4 is an interaction diagram of a method for communicating orders from users to a vendor associated with a venue, in accordance with one embodiment.

FIG. 4 is an interaction diagram of one embodiment of a method for communicating orders from users to a vendor 120 associated with a venue 100. As shown in FIG. 4, client devices 210A and 210B send orders to the venue management system 250, which subsequently communicates the orders to a vendor system 240 associated with the vendor 120 to be fulfilled. As further described below, the venue management system 250 may generate a group of orders based on characteristics of received orders and communicate the group of orders to the vendor system 240 to be fulfilled. The client device 210A receives input from a user specifying an order identifying a product or service, information identifying the user, and the vendor 120 associated with the vendor management system 240 and sends 405 the order to the venue management system 250. In some embodiments, additional information is included in the order, such as a region 110 of the venue 100 associated with the user, a location of the client device 210A, or a status of the user as determined from the user's user profile.

After receiving the order from the client device 210A, the venue management system 250 stores 410 the order in a queue for a specified time interval. The queue may include multiple orders received from different client devices 210. After storing 410 the order in the queue for the specified time interval, the venue management system 250 communicates the order to the vendor management system 240 associated with the vendor 120 identified in the order. In various embodiments, the specified time interval is measured from a time when the order was received by the venue management system 250. The threshold period of time for which the order is stored 410 in the queue may be modified by a user authorized by the venue management system 250 or by the venue management system 250 itself based on various factors, such as the number of orders included the queue, a frequency with which orders have been received over a period of time, or an expected frequency with which orders are to be received during a subsequent time interval. In some embodiments, different vendors 120 may provide different specified time intervals to the venue management system 250, allowing a vendor 120 to specify a duration an order identifying the vendor 120 is stored 410 in a queue.

In addition to storing 410 the orders in the queue for the specified period of time, the venue management system 250 determines a position in the queue in which the order is stored 410. While the venue management system 250 determines the position in the queue based on a time associated with the order, such as a time the order was received by the venue management system 250 or a time when the order was received by the client device 210A, additional characteristics of the order may also be used to determine the position of the order in the queue. For example, the venue management system 250 determines a status of the user associated with the order from a user profile associated with the user or from the order. As a specific example, an order received from a user associated with a specific status receives priority over orders from users with different statuses, so the order received from the user with the specific status is placed in a position in the queue ahead of positions of orders received from users with different statutes. In some embodiments, orders received from a user with a certain status are communicated from the venue management system 250 to the vendor system 240 of the vendor 120 without being stored 410 in the queue to expedite fulfillment of orders received from users with the certain status. Additional characteristics associated with a user associated with the order may also be used to determine a position in the queue in which the order is stored 410; examples of additional characteristics include a number of orders previously received from the user, a frequency with which orders are received from the user, and a location associated with the user. In other embodiments, other characteristics of the order may be used by the venue management system 250 to determine the position in the queue of the received order. For example, the venue management system 250 determines the position of the order in the queue based on the types of product included in the order or quantities of products included in the order. Orders with fewer products (or services) or identifying products (or services) with shorter preparation time, such as beverages, may receive positions in the queue ahead of orders including larger numbers of products (or services) or identifying products (or services) having a longer preparation time. In another example, an order identified as being previously incorrectly fulfilled by the vendor 120 (e.g., based on a flag or other data included in the order) is placed in an earliest position in the queue or is communicated from the venue management system 250 to the vendor 120 for fulfillment without being stored 410 in the queue.

While the order is stored 410 in the queue, the venue management system 250 receives additional orders from client devices 210A or client device 210B. In the example of FIG. 4 the client device 210B sends 415 an additional order to the venue management system 250 for fulfillment while the order is stored 410 in the queue, and the client device 210A also sends 420 an additional order to the venue management system 250 while the order is stored 410 in the queue. The additional order from the client device 210A and the additional order from the client device 210B each identify one or more products or services, identify a user, and identify a vendor 120. As described above, the additional order from the client device 210A and the additional order from the client device 210B are also stored in the queue for the specified time interval.

The venue management system 250 also identifies characteristics of received orders and determines 425 if different received orders include matching or similar characteristics. Examples characteristics of an order include: a type of products included in an order, a vendor 120 identified in the order, a status of the user placing the order, a region 110 associated with a user identified in the order, a number of items included in the order, an estimated time to prepare the product or service identified in the order, or a location of a vendor 120 identified in the order. The venue management system 250 generates 430 a group including orders stored 410 in the queue having at least a threshold number of matching characteristics and identifying a common vendor 120. Characteristics of different orders are identified and compared to each other to determine 425 if the different orders include matching or similar characteristics 425; in some embodiments, the venue management system 250 associates one or more additional characteristics with a characteristic to indicate the additional characteristics are similar to the characteristic.

Based on the characteristics of the order and the additional orders, the venue management system 250 generates 430 one or more groups, with each group including orders identifying a common vendor 120 and having at least a threshold number of matching, or similar, characteristics. For example, in FIG. 4, if the order and the additional order received from the client device 210B identify a common vendor 120 and are each associated with users in a common region 110 of the venue 100, the venue management system 250 generates 430 a group including the order and the additional order received from the client device 210B; in the preceding example, if the additional order received from the client device 210A identifies the common vendor 120 but is associated with a user in a different region 110 of the venue 100, the additional order received from the client device 210A is not included in the group. As another example, the order and the additional order received from the client device 210A identify a common vendor 120 and also identify a common type of product (e.g., a beverage), so the venue management system 250 generates 430 a group including the order and the additional order received from the client device 210A. Hence, a group includes orders that each identify a common vendor 120 and that are also each associated with users associated with a common region 110 of the venue, that identify products (or services) having times to fulfill within a threshold value of each other, that identify a common type of product, or that identify any other suitable common characteristic. Each generated group of orders may be associated with a group identifier, and orders included in the group are associated with the group identifier. Different groups may be associated with different vendors 120.

The venue management system 250 may account for a variety of factors when generating 430 a group of orders. In some embodiments, the venue management system 250 limits the number of orders included in a group to a threshold number. Different threshold numbers may be associated with different vendors 120. In some embodiments, the threshold number of orders included in a group varies over time or based on one or more factors. If the venue management system 250 does not determine that an order in the queue has similar characteristics to one or more other orders in the queue and the order has been stored in the queue for greater than the specified period of time, the venue management system 250 sends 435 the order to the vendor system 240 associated with the vendor 120 identified in the order to be fulfilled.

The venue management system 250 sends 435 the group to the vendor system 240 associated with a vendor 120 identified by the orders in the group after the order has been stored 410 in the queue for the specified period of time. If additional orders do not identify a common vendor as the received order or identify the common vendor as the received order but do not have at least the threshold number of characteristics matching or similar to characteristics of the order, the venue management system 250 communicates 435 the order to the vendor system 240 after the specified period of time has lapsed. Communicating a group of orders to a vendor 120 allows the vendor 120 to more efficiently fulfill orders from users. In one embodiment, the venue management system 250 communicates relative positions of orders in the group to the vendor system 240 based on the positions of the orders in the queue maintained by the venue management system 250 so the vendor 120 fulfills orders in the group based on the positions of the orders in the queue.

Modifying Associations Between Vendors and Regions of a Venue

Figure 5:
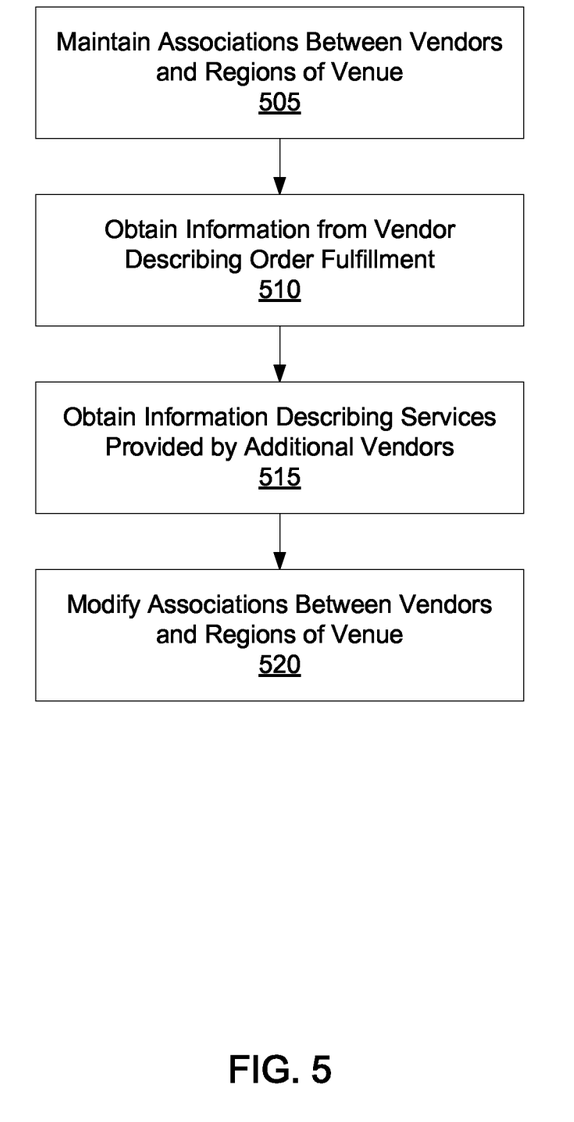
FIG. 5 is a flowchart of a method for associating a vendor with one or more regions of a venue, in accordance with one embodiment.

FIG. 5 is a flowchart of one embodiment of a method for associating a vendor 120 with one or more regions of the venue 100. In other embodiments, the method may include different and/or additional steps than those described in conjunction with FIG. 5. Additionally, in other embodiments, steps of the method may be performed in orders different than the order described in conjunction with FIG. 5.

As described above in conjunction with FIG. 3, the venue management system 250 maintains 505 associations between vendors 120 and regions 110 of the venue 100. Associating a vendor 120 with one or more regions 110 of the venue allows the venue management system 250 to reduce times for users in one or more regions 110 to receive products or services from vendors 120 by communicating orders received from users in a region 110 to a vendor 120 associated with the region. In some embodiments, the venue management system 250 maintains 505 a vendor profile of a vendor 120 that includes identifiers of one or more regions 110 to associate the regions 110 with the vendor 120. In some embodiments, the venue management system 250 may associate portions of a region 110, such as a number of rows within the region 110, with a vendor 110. Various criteria may be used to associate one or more regions 110 with a vendor 120. For example, a vendor 120 is associated with one or more regions 110 based on a distance between a location associated with the vendor 120 and the regions 110 (e.g., a vendor 120 is associated with regions 110 within a threshold distance of a location associated with the vendor 120). In another example, a vendor 120 is associated with a region 110 based on one or more types of products ordered by the users located in the region 110 and types of products provided by the vendor 120. Hence, a region 110 includes a set of locations to which users attending the venue are associated and associating the vendor with the region indicates the vendor provides products to the users associated with the region 110. For example, associating a vendor providing food items with a region of the venue 100.

The venue management system 250 obtains 510 information from a vendor 120 describing the fulfillment of orders by the vendor 120. The information obtained 510 from the vendor 120 includes data from which the venue management system 250 is capable of determining a length of time for the vendor 120 to fulfill received orders; the length of time determined by the venue management system 250 may be an estimation of a time to fulfill orders by the vendor 120, a time to fulfill orders by the vendor 120, an indication of the time for the vendor 120 relative to other vendors 120, or any other suitable information. For example, the venue management system 205 obtains 510 information obtained from a vendor 120 specifying an estimated time to fulfill subsequently received orders for products (or services), an estimated time to fulfill pending orders for products (or services), an average time in which previously received orders were fulfilled, a number of unfulfilled orders received by the vendor 120 within a time interval, a number or a frequency of orders received by a vendor 120 from users associated with different regions 110, or preparation times associated with various services or products provided by a vendor 120. Information obtained 510 by the venue management system 250 accounts for orders received by the vendor 120 via the venue management system 250 as well as orders received by the vendor 120 from users visiting a location associated with the vendor 120. Obtaining 510 information from a vendor 120 describing fulfillment of orders by the vendor 120 allows the venue management system 250 to monitor the order fulfillment capabilities of a vendor 120, such as whether the vendor 120 is capable of fulfilling orders received within a threshold interval of a current time (either before the current time or after the current time) from users associated with regions 110 associated with the vendor 120 within a threshold period of time.

In addition to obtaining 510 information from a vendor 120 describing order fulfillment associated with the vendor 120, the venue management system 250 obtains 515 information describing services or products provided by additional vendors 120. Example information describing products or services provided by an additional vendor 120 include a description of products or services provided the additional vendor 120 (e.g., beverages or food offered by the additional vendor 120), a location of the additional vendor 120, and one or more regions 110 associated with the additional vendor 120. Additionally, information obtained 515 from an additional vendor 120 includes data from which the venue management system 250 is capable of determining a length of time for the additional vendor 120 to fulfill received orders; the length of time determined by the venue management system 250 may be an estimation of a time to fulfill orders by the additional vendor 120, a time to fulfill orders by the additional vendor 120, an indication of the time for the additional vendor 120 relative to other vendors 120, or any other suitable information. For example, information obtained 515 from an additional vendor includes: a number of orders yet to be fulfilled by the additional vendor 120, a number of additional orders the additional vendor 120 is capable of handling, an estimated time for the additional vendor 120 to fulfill orders received within a threshold period of time from a current time (e.g., within threshold period of time before a current time or within the threshold period of time from the current time), an average time in which previously received orders were fulfilled by the additional vendor 120, or a number of orders currently unfulfilled by the additional vendor 120. Information describing an additional vendor 120 accounts for orders the additional vendor 120 received via the venue management system 250 as well as orders additional vendor 120 received from users visiting a location associated with the additional vendor 120.

In one embodiment, the venue management system 250 obtains 515 information from additional vendors 120 that provide products or services matching, or similar to, products or services provided by the vendor 120. For example, the vendor 120 provides users with hamburgers and soft drinks, so the venue management system 250 identifies additional vendors that also provide hamburgers and soft drinks and obtains 515 information from the identified additional vendors. In another embodiment, the venue management system 250 obtains 515 information from additional vendors 120 associated with locations within a threshold distance of a location of the vendor 120. In other embodiments, the venue management system 250 obtains 515 information from additional vendors 120 associated with regions 110 within a threshold distance of a region 110 associated with the vendor 120, from additional vendors 120 associated with regions 110 that include users having at least at threshold number of characteristics matching, or similar to, characteristics of users associated with a region 110 associated with the vendor 120, or from additional vendors 120 having at least a threshold number of characteristics matching, or similar to, characteristics of the vendor 120.

Based on the obtained information describing fulfillment of orders by the vendor 120 and the obtained information from the additional vendors 120, the venue management system 250 determines whether to modify associations between one or more vendors 120 and one or more regions 110, and modifies 520 associations between one or more vendors 120 and one or more regions 110 of the venue 100 to expedite fulfillment of orders by various vendors 120 in response to the determination. Modifying associations between vendors 120 and the regions 110 allows the venue management system 250 to direct orders received from users of certain regions 110 to vendors 120 with capacity and capability to fulfill the orders more efficiently than vendors 120 originally associated with the certain regions 110. In one embodiment, one or more users authorized by the venue management system 250 communicate information to the venue management system 250 to modify regions 110 of the venue associated with one or more vendors 120. For example, a user authorized by the venue management system 250 determines an estimated time for a vendor 120 to fulfill orders received after a current time or to fulfill pending orders is greater than a threshold amount based on the information obtained 510 from the vendor 120; to expedite fulfillment of subsequently received orders identifying the vendor 120 from users associated with locations within a region 110 associated with the vendor 120, the user authorized by the venue management system 250 provides an to the venue management system 250 to modify 520 the association between one or more regions 110 and the vendor 120, so one or more regions 110 initially associated with the vendor 120 are associated with an additional vendor 120 providing similar products or services as the vendor 120. The additional vendor 120 may be identified by the instruction as a vendor 120 having less than a threshold time to fulfill orders received within a threshold time from a current time, a vendor 120 having less than a threshold number of unfulfilled orders, or as a vendor satisfying any suitable criteria. Alternatively, the instruction specifies a specific additional vendor 120 associate with a region 110.

In another embodiment, the venue management system 250 modifies 520 associations between vendors 120 and regions 110 based on determinations made by applying on one or more rules to information obtained 510 from the vendor and to information obtained 515 from the additional vendors 120. For example, the venue management system 250 continuously monitors information obtained 510 from the vendor 120 and information obtained 515 from the additional vendors 120, or periodically monitors information obtained 510 from the vendor 120 and information obtained 515 from the additional vendor 515 to determine whether to modify one or more associations between one or more regions 110 and the vendor 120. An example rule modifies 520 associations between vendors 120 and regions 110 of the venue 100 if an estimated time for a vendor 120 associated with a region 110 to fulfill orders received within a threshold time of a current time is greater than a threshold time. If application of the rule determines the estimated time for the vendor 120 to fulfill orders received within the threshold time of the current time exceeds the threshold time, the venue management system 250 identifies an additional vendor 120 that provides similar services or products as the vendor 120, that is located within a threshold distance of the region 110 associated with the vendor 120, and that has an estimated to fulfill orders received within the threshold time of the current time that does not exceed the threshold value. The venue management system 250 modifies 520 the association between the region 110 and the vendor 120 to associate the region 110 with the identified additional region 110. Other example rules determine to modify an association between a region 110 and a vendor 120 if the vendor 120 is associated with greater than a threshold number of unfulfilled orders, if an average time in which previously received orders were fulfilled by the vendor exceeds a threshold time, if a number of unfulfilled orders received by the vendor 120 within a time interval exceeds a threshold number, if a frequency of orders received by the vendor 120 from users associated with a region 110 associated with the vendor 120 exceeds a threshold value, or if any other suitable criteria are satisfied by information obtained 510 from the vendor 120. A rule may also specify criteria for an additional vendor 120 to satisfy to associate the additional vendor 210 with a region (e.g., the additional region 120 has less than a threshold number of unfulfilled orders, the additional region 120 has an average time in which previously received orders were fulfilled that is less than a threshold time, a frequency of orders received by the vendor 120 from a region associated with the vendor 120 is less than a threshold value).

Other example rules determine whether to modify 520 associations between vendors 120 and regions 110 based on a number of orders received by vendors 120 within a threshold period of time, a number of pending orders associated with various vendors 120, or a frequency of orders received by the vendors 120 from one or more regions 110. For instance, the venue management system 250 determines from the information obtained 510 from the vendor 120 that the vendor 120 has greater than a threshold number of pending orders and accordingly modify 520 an association between one or more regions 110 and the vendor 120 to associate at least a subset of the one or more regions 110 with an additional vendor 120 providing similar products or services as the vendor 120 and having less than the threshold number of pending orders. Similarly, associations between a vendor 120 and one or more regions 110 may be modified if a number of orders received by a vendor 120 within a threshold period of time or a frequency of orders received by the vendor 120 exceeds a threshold value. In some embodiments, the venue management system 250 removes an identifier of a region 110 from a vendor profile associated with the vendor 120 and includes the identifier of the region 110 in a vendor profile associated with the additional vendor 120 to modify 520 association between the region 110 and the vendor 120. The venue management system 250 may separately store information identifying the association between the vendor 120 and the region in some embodiments to allow the venue management system 250 to subsequently associate the region 110 with the vendor 120 (e.g., when characteristics of the vendor 120 satisfy one or more criteria).

When modifying 520 regions 110 associated with a vendor 120 or with additional vendors 120, the venue management system 250 may account for products or services provided by the vendor 120 and by the additional vendors 120 so similar products or services are provided to users in a region 110 before and after associations between vendors 120 associated with the region 110 are modified 250. For example, a rule determining whether to modify 520 the association between a region 110 and a vendor 120 identifies an additional vendor 120 having at least a threshold number of products or services matching, or similar to, products or services provided by the vendor 120. Other rules may identify an additional vendor 120 to associate with a region 110 having less than a threshold distance between a location associated with the additional vendor 120 and the vendor 120 or having less than a threshold distance between the location associated with the additional vendor 120 and a region associated with the vendor 120.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    receiving, at a venue management system for a venue including a plurality of vendors that are each associated with a different region within the venue and each associated with a different vendor system, an order having one or more characteristics and identifying a vendor to fulfill the order;
    storing the order in a queue maintained by the venue management system for a specified time period;
    receiving one or more additional orders at the venue management system while the order is stored in the queue;
    storing the one or more additional orders with the order in the queue maintained by the venue management system;
    identifying, by the venue management system, characteristics of each of the one or more additional orders;
    generating, by the venue management system, a group including the order and one or more additional orders having characteristics that identify the vendor and that are associated with other users associated with a region within the venue associated with the user associated with the order; and
    communicating the group from the venue management system to a vendor system associated with the vendor after the specified time period has lapsed.

2. The method of claim 1, wherein storing the order in the queue maintained by the venue management system for the specified time interval comprises:
    determining a position of the order in the queue based at least in part on one or more characteristics of the order; and
    storing the order in the queue in the determined position.

3. The method of claim 2, wherein the characteristics of the order include one or more characteristics of a user associated with the order.

4. The method of claim 3, wherein a characteristic of the user associated with the order comprises a status associated with the user by the venue management system.

5. The method of claim 3, wherein a characteristic of the user associated with the order is selected from a group consisting of: a number of orders previously received from the user, a frequency with which orders are received from the user, a location associated with the user, and any combination thereof.

6. The method of claim 2, wherein a characteristic of the order is selected from a group consisting of: a type of product or service included in the order, a quantity of products or services included in the order, and any combination thereof.

7. The method of claim 1, wherein generating, by the venue management system, the group including the order and one or more additional orders having characteristics that identify the vendor and that are associated with other users associated with a region within the venue associated with the user associated with the order comprises:
generating a group including the order and one or more additional orders that identify the vendor, that are associated with users associated with a region within the venue associated with the user associated with the order, and that identify a type of product matching a type of product identified by the order.

8. The method of claim 1, wherein generating, by the venue management system, the group including the order and one or more additional orders having characteristics that identify the vendor and that are associated with other users associated with a region within the venue associated with the user associated with the order comprises:
generating a group including the order and one or more additional orders that identify the vendor, that are associated with users associated with a region within the venue associated with the user associated with, and that identify a type of product having a time to fulfill within a threshold value of a time to fulfill a type of product identified by the order.

9. The method of claim 1, further comprising:
communicating the order to the vendor if the specified time period has lapsed and none of the additional orders identifying the vendor have at least the threshold number of characteristics matching characteristics of the order.

10. The method of claim 1, wherein the specified time period is associated with the vendor.

11. The method of claim 1, wherein the group includes no greater than a threshold number of orders.

12. The method of claim 11, wherein the threshold number of orders is associated with the vendor.

13. A computer program product comprising a computer readable storage medium having instructions encoded thereon that, when executed by a processor, cause the processor to:
receive, at a venue management system for a venue including a plurality of vendors that are each associated with a different region within the venue and each associated with a different vendor system, an order having one or more characteristics and identifying a vendor to fulfill the order;
store the order in a queue maintained by the venue management system for a specified time period;
receive one or more additional orders at the venue management system while the order is stored in the queue;
store the one or more additional orders with the order in the queue maintained by the venue management system;
identify, by the venue management system, characteristics of each of the one or more additional orders;
generate, by the venue management system, a group including the order and one or more additional orders having characteristics that identify the vendor and that are associated with other users associated with a region within the venue associated with the user associated with the order; and
communicate the group from the venue management system to a vendor system associated with to the vendor after the specified time period has lapsed.

14. The computer program product of claim 13, wherein store the order in the queue maintained by the venue management system for the specified time interval comprises:
determine a position of the order in the queue based at least in part on one or more characteristics of the order; and
store the order in the queue in the determined position.

15. The computer program product of claim 14, wherein the characteristics of the order include one or more characteristics of a user associated with the order.

16. The method of claim 15, wherein a characteristic of the user associated with the order comprises a status associated with the user by the venue management system.

17. The computer program product of claim 13, wherein generate, by the venue management system, the group including the order and one or more additional orders having characteristics that identify the vendor and that are associated with other users associated with a region within the venue associated with the user associated with the order comprises:
generating a group including the order and one or more additional orders that identify the vendor and that identify a type of product matching a type of product identified by the order.

18. The computer program product of claim 13, wherein generate, by the venue management system, the group including the order and one or more additional orders having characteristics that identify the vendor and that are associated with other users associated with a region within the venue associated with the user associated with the order comprises:
generating a group including the order and one or more additional orders that identify the vendor and that identify a type of product having a time to fulfill within a threshold value of a time to fulfill a type of product identified by the order.

* * * * *

UNITED STATES PATENT AND TRADEMARK OFFICE
CERTIFICATE OF CORRECTION

PATENT NO. : 10,204,332 B2
APPLICATION NO. : 14/588234
DATED : February 12, 2019
INVENTOR(S) : John E. York et al.

Page 1 of 1

It is certified that error appears in the above-identified patent and that said Letters Patent is hereby corrected as shown below:

In the Claims

Column 24, Line 20, after "associate with" delete "to"

Signed and Sealed this
Twenty-fourth Day of September, 2019

Andrei Iancu
*Director of the United States Patent and Trademark Office*